United States Patent Office 3,652,620
Patented Mar. 28, 1972

3,652,620
α,β-UNSATURATED OXIME COMPLEXES OF NICKEL NITROSYL HALIDES AND THEIR PREPARATION
Robert A. Clement, Wilmington, Del., assignor to E. I. du Pont de Nemours and Company, Wilmington, Del.
No Drawing. Filed Oct. 23, 1970, Ser. No. 83,639
Int. Cl. C07f 15/04; C07c 3/10
U.S. Cl. 260—439 R     9 Claims

ABSTRACT OF THE DISCLOSURE

Novel complexes of nickel nitrosyl halides with α,β-unsaturated oximes, e.g., nickel nitrosyl bromide-acrolein oxime complex, are prepared by reacting nitric oxide with (1) a π-allyl nickel halide or (2) an allylic halide and nickel tetracarbonyl. The new complexes are useful precursors of known complexes, e.g., triphenylphosphine(nitrosyl)bromonickel, a known catalyst for the oligomerization of olefins.

BACKGROUND OF THE INVENTION (1) Field of the invention

This invention relates to, and has as its principal objects provision of, novel compositions of matter, α,β-unsaturated oxime complexes of nickel nitrosyl halides, and the synthesis of the same.

(2) Relationship to the prior art

Nickel nitrosyl halide complexes of the type

[Ni(NO)XL]$_2$ and Ni(NO)XL$_2$ (X=halogen, L=trivalent nitrogen, phosphorus or arsenic or divalent sulfur) have been prepared by metathetical reactions from other nickel nitrosyl complexes [G. Booth and J. Chatt, J. Chem. Soc., 2099 (1962)], by addition of electron donor ligands to the parent nickel nitrosyl halides [W. Hieber and I. Bauer, Z. anorg. allgem. Chem., 321, 107 (1963)], and by reductive nitrosation of nickel(II) halide complexes [R. D. Feltham, Inorg. Chem., 3, 116 (1964); H. Brunner, Chem. Ber., 101, 143 (1968)].

The utility of some of the prior art complexes in catalyzing the oligomerization of olefins has also been described [U.S. Pat. 3,427,365].

Nowhere are there described complexes of the type now claimed, i.e., Ni(NO)XL, where L is an α,β-unsaturated oxime and X is halogen.

SUMMARY AND DETAILS OF THE INVENTION

The present novel compounds have the generic formula (I)
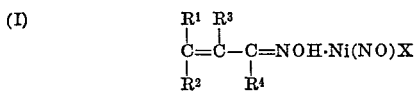

wherein: R$^1$, R$^2$, R$^3$ and R$^4$, alike or different, are hydrogen or unsubstituted or substituted alkyl, alkoxy, cycloalkyl, aryl, alkenyl, cycloalkenyl, aralkyl or aralkenyl of up to 12 carbon atoms, any substituent being one of the functional groups cyano, halogen (chlorine, fluorine, bromine, iodine), alkoxy or ester, i.e., —COOR, where R is alkyl, aryl or cycloalkyl of up to 8 carbon atoms or R$^2$ and R$^4$ may be connected as part of a carbocyclic ring containing up to 16 carbon atoms; and X is fluorine, chlorine, bromine or iodine.

Thus, in Formula I, R$^1$, R$^2$, R$^3$ and R$^4$ may be: methyl, ethyl, propyl, butyl, pentyl, neopentyl, octyl dodecyl; methoxy, isopropoxy, butoxy, heptoxy, dodecycloxy; cyclopentyl, cyclohexyl, cycloheptyl, cyclooctyl; phenyl or naphthyl; vinyl, 4-methyl-3-pentenyl, 3,4-dimethylhexenyl; cyclopentenyl, cyclohexenyl, cycloheptenyl, cyclooctenyl; benzyl, β-phenylethyl; cinnamyl, γ-phenylallyl; cyanomethyl, β-cyanoethyl, β-cyanopropyl, β-cyanobutenyl; chloromethyl, β-chloroethyl, β-bromoethyl, γ-chloropropyl, γ-chlorohexyl; β-methoxyethyl, methoxymethyl, β-methoxypropyl; carbomethoxymethyl, β-carbomethoxyethyl, β-carboethoxyethyl, β-carbomethoxypropyl, carbomethoxy, carboethoxy, carbopropoxy, carbobutoxy, carbophenoxy; or acetonyl, 2-ketonyl or 3-ketobutyl; or R$^2$ and R$^4$, connected together, may be dimethylene, trimethylene, tetramethylene, pentamethylene, etc.

The α,β-unsaturated oxime complexes of nickel nitrosyl halides (I) of this invention may be prepared by two methods discussed separately below. The first is by the action of nitric oxide on an π-allyl nickel halide according to the following equation:

(1)
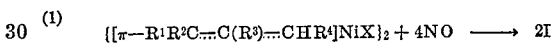

the R's and X being as described above. The (π-allyl) nickel halides required as reagents in this reaction may be prepared by the interaction of allylic halides and nickel tetracarbonyl [R. F. Heck, J. Am. Chem. Soc., 85, 2013 (1963); E. J. Corey, et al., J. Am. Chem. Soc., 89, 2755 (1967)], by the interaction of allylic halides and nickel (O) hydrocarbon complexes (Neth. appl. 6409178, Feb. 11, 1965] or by the action of hydrohalic acids on bis(π-allyl)nickel complexes [Neth. appl. 6409180, Feb. 11, 1965]. A partial listing of (π-allyl)nickel halides suitable as reagents in reaction (2), together with products, is given in Table I.

The reaction temperature for the reaction of Equation 1 ranges from —100° C. to +100° C., the preferred range being from —80° C. to +50° C.

The reaction is run in any suitable solvent which must be inert toward reactants and products and, for low temperature reactions, must remain fluid. Suitable solvents include ethers, hydrocarbons, esters, nitriles and ketones such as diethyl ether, hexane, toluene, ethyl acetate, acetonitrile and acetone.

The product is isolated by low temperature crystallization from a suitable solution, by precipitation of the product from solution by addition of an appropriate diluent, or by continuous extraction of the product with a solvent in which it has limited solubility. In all cases the operations must be carried out in an inert atmosphere since the product complexes are very air-sensitive, especially in solution.

Reaction occurs readily with subatmospheric pressures of nitric oxide, but is not diminished by higher pressures. Pressure may range from subatmospheric to 500 p.s.i. (the normal tank pressure in commercial cylinders), the preferred range being in the neighborhood of atmospheric pressure. The nitric oxide (NO) used should be purified (e.g., by passage over Ascarite® or through a cold trap) to remove traces of acidic higher oxides of nitrogen.

The reaction may be carried out in a closed system, but it is most conveniently conducted in a system open to the atmosphere but protected from the atmosphere by a bubble tube or similar device. In the latter case, NO may be simply passed over the solution of reactants until no more NO is absorbed.

The second method of preparation of the complexes of the invention, i.e., of Formula I, is by the reaction of nitric oxide with nickel tetracarbonyl and an allylic halide according to the folowing equation:

(2) 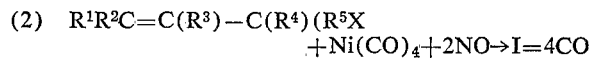
    $+Ni(CO)_4+2NO \rightarrow I=4CO$

In Equation 2, $R^2$, $R^3$ and $R^4$ are as described above, but either $R^1$ or $R^5$ must be hydrogen and X can only be bromine or iodine. $R^1$ or $R^5$, when not hydrogen, can be any of the groups listed above for $R^2$, $R^3$ or $R^4$. A partial listing of allylic halides suitable for reaction according to Equation 2, is provided in Table II. They are readily available commercially or by standard procedures from common commercial chemicals.

The reaction temperature for the reaction of Equation 2 ranges from $-80°$ C. to $+150°$ C., the preferred range being $0°$ C. to $80°$ C. At lower temperatures, reaction is too slow; at higher temperatures thermal decomposition of $Ni(CO)_4$ and reaction of $Ni(CO)_4$ with NO are too rapid.

Reaction is run in any suitable solvent which must be inert toward reactants and products. Such solvents include ethers, hydrocarbons, esters, nitriles, and ketones such as diethyl ether, hexane, toluene, ethyl acetate, acetonitrile and acetone.

Pressures of NO required for reaction are as described for the reaction of Equation 1 with the same restriction upon the purity of NO.

Reaction may be conducted as described for the reaction of Equation 1. In the present case, however, an open system (protected from the atmosphere by a bubble tube or similar device) is much preferred, since it provides a means of carrying away the CO which is evolved during the reaction. In this case, NO is passed over the solution of reactants until the flow of gas leaving the system diminishes and becomes equal to the flow of gas entering the system.

Product may be isolated as described in the previous section.

EMODIMENTS OF THE INVENTION

In the following examples, all the compounds are air-sensitive, especially in solution, and all operations are carried out in a nitrogen atmosphere. Nickel tetracarbonyl is hazardous and should be used in a hood.

EXAMPLE 1

Nickel nitrosyl bromide-acrolein oxime complex
[$CH_2$=CHCH=NOH·Ni(NO)Br]

PART A.—PREPARATION OF ($\pi$-ALLYL)NICKEL BROMIDE

Nickel tetracarbonyl (100 ml., 132 g. 0.77 mole) and hexane (150 ml.) were placed in a 500-ml. round-bottomed flask, equipped with a magnetic stirrer and an addition funnel with exit to the atmosphere via condenser packed with Dry Ice and a bubble tube. The reaction mixture was stirred at ambient temperature (ca. 27° C.) while allyl bromide (30 ml., 42 g., 0.35 mole) was added from the addition funnel at such a rate as to maintain a brisk evolution of gas. The reaction mixture turned dark red and an orange-red solid appeared.

After completion of the allyl bromide addition, the mixture was stirred at ambient temperature, and then at ca. 30° C., until gas evolution virtually ceased. (ca. 3 hours were required to this point.) Volatiles were removed from the reaction mixture under reduced pressure and caught in a Dry Ice trap. The solid residue was taken up in ether (600 ml.), filtered through decolorizing carbon, and cooled at a temperature of approximately $-80°$ C. for 18 hours. Solvent was removed at that temperature via filter stick and, finally, in a stream of nitrogen, to afford a residue of $\pi$-allylnickel bromide dimer (37.7 g., 60% on allyl bromide) as beautiful red-black blades. The infrared spectrum (Nujol mull) was sparse, exhibiting major absorption at 1020, 977, 970, 928, 920 and 910 cm.$^{-1}$. The NMR spectrum (benzene, external tetramethyl silane reference) was definitive with doublets at $\tau=8.98$ (J=13 c.p.s., area=2) and $\tau=7.95$ (J=7 c.p.s., area=2) and a septuplet centered at $\tau=5.66$ ($J_{1,7}=40$ c.p.s., $J_{2,6}=27$ c.p.s., $J_{3,5}=12$ c.p.s., area=1).

PART B.—PREPARATION OF THE COMPLEX

A solution of ($\pi$-allyl)nickel bromide (20 g., 111 mmoles of Ni) in toluene (100 ml.) was placed in a bottle made of a borosilicate glass, sold under the trademark Pyrex®, the system was evacuated, and the Pyrex® bottle was immersed in a Dry Ice bath. Nitric oxide (NO, purified by passage through a tower containing a mixture of sodium hydroxide, calcium oxide and asbestos, used as a carbon dioxide absorbent, sold under the trademark Ascarite®) was admitted to the Pyrex® bottle via a calibrated reservoir at pressures between 14 and 3 p.s.i.g. Reaction was instantaneous as judged by the immediate formation of a deep blue solution and solid and by a steady pressure drop in the system. When pressure in the system remained constant for 1 hour, reaction was judged complete, and excess nitric oxide was removed via the calibrated reservoir. The reaction mixture was filtered and the precipitate was rinsed with toluene and dried to afford a dark green powder (5.24 g.), nickel nitrosyl bromide. The combined toluene filtrates were evaporated under reduced pressure to afford crude oxime complex as a dark blue solid (19.54 g.). Purification was effected by dissolution of the crude complex in benzene, filtration, and precipitation by the addition of hexane. The analytical sample obtained in this manner was a dark blue air-sensitive powder.

*Analysis.*—Calcd. for Ni(NO)Br·$CH_2$=CHCH=NOH (percent): C, 15.03; H, 2.10; Br, 33.34; N, 11.69; Ni, 24.49. Found (percent): C, 15.46; H, 2.18; Br, 34.22; N, 12.07; Ni, 24.48.

In the infrared (KBr wafer, Nujol mull), the oxime complex exhibited absorption at 3350 cm.$^{-1}$, 1855 cm.$^{-1}$ and 1835 cm.$^{-1}$. The NMR spectrum (deuterioactone) was consistent with the structure:

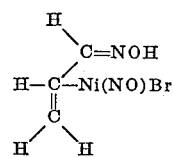

with rapid exchange of the oxime ligand. It exhibited a broad singlet at $\tau=0.63$, a doublet centered at $\tau=2.50$ ($H_A$), a multiplet at $\tau=3.22$ to 3.83 ($H_B$), and a pair of doublets centered at $\tau=4.61$ ($H_D$) and 4.70, with $J_{AB}=9$ c.p.s., $J_{BC}=10$ c.p.s. and $J_{BD}=18$ c.p.s.

In the manner of Example 1, nitric oxide can be reacted with the allyl nickel halide shown in Table I, to give the corresponding oxime complex, also shown.

TABLE I $\{[\pi\text{-}R_1R_2C \cdots C(R_3) \cdots CHR_4]NiX\}_2 + 4NO \rightarrow 2R_1R_2C=C(R_3)-C(R_4)=NOH\cdot Ni(NO)X$

| Reactant | Product | Reference to [(π-allyl)nickel]$_2$ |
|---|---|---|
| 2. [(π-CH$_2$⋯CH⋯CH$_2$)NiI]$_2$ | CH$_2$=CH—CH=NOH·Ni(NO)I | M. L. H. Green, P. L. I. Nagy, "Advances in Organometallic Chemistry," 2, 325 (1964). |
| 3. [(π-CH$_2$⋯CH⋯CH$_2$)NiCl]$_2$ | CH$_2$=CH—CH=NOH·Ni(NO)Cl | Neth. Appl. 6409180; 2/11/65; Studiengesellschaft Kohle m.b.H. |
| 4. [(π-CH$_2$⋯C(CH$_3$)⋯CH$_2$)NiBr]$_2$ | CH$_2$=C(CH$_3$)—CH=NOH·Ni(NO)Br | E. J. Corey, M. F. Semmelhack, J. Am. Chem. Soc. 89, 2755 (1967). |
| 5. [(π-CH$_3$—C(CH$_3$)⋯CH⋯CH$_2$)NiBr]$_2$ | CH$_3$—C(CH$_3$)=CH—CH=NOH·Ni(NO)Br | Do. |
| 6. [(π-CH$_2$⋯C(COOCH$_2$CH$_3$)⋯CH$_2$)NiBr]$_2$ | CH$_2$=C(COOCH$_2$CH$_3$)—CH=NOH·Ni(NO)Br | Do. |
| 7. [(π-CH$_3$—C(CH$_3$)=CHCH$_2$CH$_2$C(CH$_3$)⋯CH⋯CH$_2$)NiBr]$_2$ | CH$_3$—C(CH$_3$)=CHCH$_2$CH$_2$C(CH$_3$)=CH—CH=NOH·Ni(NO)Br | Do. |
| 8. {(π-C$_8$H$_{13}$)NiBr}$_2$ | C$_8$H$_{13}$—NOH·Ni(NO)Br | E. J. Corey, M. F. Semmelhack, L. S. Hegedus, J. Am. Chem. Soc. 90, 2416 (1968). |

EXAMPLE 9

Nickel nitrosyl bromide-acrolein oxime complex from (π-allyl)nickel bromide (CH$_2$=CHCN=NOH·No(NO)Br A reaction was run as in Example 1, except that 14.0 g. (78 mmole of Ni) of π-allylnickel bromide was employed and ether was the solvent. Filtration of the reaction mixture afforded a dark green powder (4.96 g.), nickel nitrosyl bromide. Evaporation of the filtrate under reduced pressure afforded crude oxime complex (12.09 g.) as a dark blue solid. Purification of crude oxime complex was effected by dissolution in toluene, filtration, and crystallization at Dry Ice temperature, and afforded the analytical sample as dark purple crystals which exhibited an infrared spectrum identical with that of the analytical sample described in Example 2.

*Analysis.*—Found for Ni(NO)Br·CH$_2$=CH—CH=NOH (percent): C, 15.46; H, 2.02; N, 9.92; Ni, 24.14.

EXAMPLE 10

Nickel nitrosyl bromide-acrolein oxime complex from nickel tetracarbonyl and allyl bromide The apparatus was a 500-ml., round-bottom flask fitted with a dropping funnel, an inlet for nitrogen and nitric oxide gases, an exit via a condenser packed with Dry Ice and a bubble tube, and a magnetic stirrer. All operations were conducted with exclusion of air. Ether (250 ml.) and nickel tetracarbonyl (46 g., 265 mmoles) were placed in the flask, which was immersed in an ice bath, and allyl bromide (43 g., 350 mmoles) was added rapidly from the dropping funnel. Formation of π-allylnickel bromide proceeded immediately as evidenced by the formation of an orange-red color and gas evolution. Nitric oxide (NO, purified by passage through an Ascarite® tower) was passed over the solution at such a rate that the flow of exit gases through the bubble tube was ca. twice as fast as in its absence. The solution turned deep blue immediately. The reaction mixture was permitted to warm slowly to room temperature, to maintain brisk evolution of gas, and the flow of nitric oxide was continued at room temperature until there was no gas evolution at all when the flow of nitric oxide was stopped. A period of 3.5 hours was required to this point. Volatiles were then stripped from the reaction mixture under reduced pressure and the dark blue residue was taken up in toluene (ca. 500 ml.).

The toluene filtrate was cooled in a Dry Ice bath and the solid that formed was filtered at Dry Ice temperature and dried at the mercury pump and room temperature. It amounted to 20.0 g. (31% on nickel tetracarbonyl) of nickel nitrosyl bromide-acrolein oxime complex as a dark blue solid which exhibited an infrared spectrum indistinguishable from that of the analytical sample described in Example 1.

In the manner of Example 10, nickel tetracarbonyl and nitric oxide can be reacted with the allylic halides shown in Table II to give the corresponding oxime complex, also shown.

TABLE II $R_1R_2C=C(R_3)-CH(R_4)X + Ni(CO)_4 + 2NO \longrightarrow R_1R_2C=C-C(R_3)=NOH\cdot Ni(NO)X + 4CO$
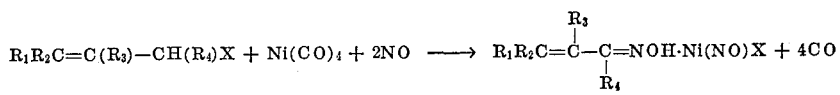

| Reactant | Product | Reference to allylic halide |
|---|---|---|
| 11. CH$_2$=CH—CH$_2$I | CH$_2$=CH—CH=NOH·Ni(NO)I | Commercial item. |
| 12. CH$_2$=C(CH$_3$)—CH$_2$Br | CH$_2$=C(CH$_3$)—CH=NOH·Ni(NO)Br | E. J. Corey, M. F. Semmelhack, J. Am. Chem. Soc. 89, 2755 (1967). |
| 13. CH$_2$=CH—C(CH$_3$)$_2$—Br | CH$_3$—C(CH$_3$)=CH—CH=NOH·Ni(NO)Br | Do. |

TABLE II.—Continued

| Reactant | Product | Reference to allylic halide |
|---|---|---|
| 14. $\begin{array}{c}COOCH_2CH_3\\ \|\\ CH_2=C-CH_2Br\end{array}$ | $\begin{array}{c}COOCH_2CH_3\\ \|\\ CH_2=C-CH=NOH\cdot Ni(NO)Br\end{array}$ | Do. |
| 15. $\begin{array}{cc}CH_3 & CH_3\\ \| & \|\\ CH_3-C=CHCH_2CH_2C=CH-CH_2Br\end{array}$ | $\begin{array}{cc}CH_3 & CH_3\\ \| & \|\\ CH_3-C=CHHC_2CH_2C=CH-CH=NOH\cdot Ni(NO)Br\end{array}$ | Do. |
| 16.  |  | E. J. Corey, M. F. Semmelhack, L. S. Hegedus, J. Am. Chem. Soc., 90, 2416 (1968). |
| 17. $BrCH_2CH=CHCH_2CH_2CH=CH-CH_2Br$ | $BrCH_2CH=CHCH_2CH_2CH=CH-CH=NOH\cdot Ni(NO)Br$ | E. J. Corey, E. K. W. Wat, J. Am. Chem. Soc. 89, 2757 (1967). |
| 18. $C_6H_5-CH=CH-CH_2Br$ | $\begin{array}{c}CH_2=CH-C=NOH\cdot Ni(NO)Br\\ \|\\ C_6H_5\end{array}$ | Commercial item. |

EXAMPLE 19

Nickel nitrosyl bromide-oxime complex of methyl vinyl ketone for nickel tetracarbonyl and crotyl bromide ($CH_2$=CHC($CH_3$)=NOH·Ni(NO)Br)

Reaction was conducted exactly as in Example 10, except that crotyl bromide (45 g., 365 mmoles, an equilibrating mixture of 1-bromo-2-butene and 3-bromo-1-butene) replaced the allyl bromide. After removal of volatiles, the dark blue gummy residue was triturated with toluene and filtered to afford a dark green solid, Ni(NO)Br, 17.2 g.) and a dark blue filtrate. The filtrate was evaporated to dryness and the residue was extracted with hexane until the extracting solvent was no longer deeply colored. Evaporation of the hexane washes afforded a solid which was rinsed with a little hexane and dried. It amounted to 6.3 g. (9.4% yield on nickel tetracarbonyl) of the nickel nitrosyl bromideoxime complex as a pale blue solid.

*Analysis.*—Calcd. for $C_4H_7BrN_2NiO_2$ (percent): C, 18.94; H, 2.78; Br, 31.49; N, 11.04; Ni, 23.14. Found (percent): C, 18.82, 19.13; H, 2.77, 3.27; Br, 31.72, 31.93; N, 9.58, 9.77; Ni, 22.78, 22.83.

In the infrared (Nujol mull, $CS_2$ solution), the complex exhibited absorption at 3350 cm.$^{-1}$ and 1820 cm.$^{-1}$. The NMR spectrum of the complex (solution in deuterioacetonitrile, external tetramethylsilane standard) was consistent with the structure:

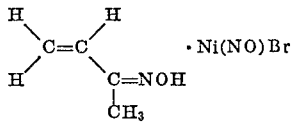

with $\tau$ values of 4.27 ($H_A$), 4.45 ($H_B$), 2.39 ($H_C$), 8.08, and 1.36, and $J_{AB}$=0 c.p.s., $J_{BC}$=11 c.p.s., and $J_{AC}$=18 c.p.s.

UTILITY

The novel compounds of the present invention are convenient starting materials for the preparation of complexes of the types, [Ni(NO)XL]$_2$ and Ni(NO)XL$_2$, where X is halogen and L is an electron donor ligand. Many complexes of the above types have been described in the literature. Several such compositions and their utility as catalysts in the oligomerization of olefins are described in U.S. Pat. 3,427,365.

These known complexes may be prepared from the novel compounds as follows:

A solution or slurry of an α,β-unsaturated oxime complex of a nickel nitrosyl halide, of generic Formula I, in an inert solvent such as ether, petroleum ether, dichloromethane, benzene, toluene, etc., is stirred with an electron donor ligand until ligand exchange is complete. The exchange is usually rapid. In most instances the solid new complex is obtained by simple filtration; in some cases further purification by recrystallization is desirable.

Depending upon whether one or two molar equivalents of electron donor ligand is employed, reaction proceeds according to Equation 3 or Equation 4.

(3)     $2Ni(NO)XL' + 2L \rightarrow [Ni(NO)XL]_2 + 2L'$ (4)     $Ni(NO)XL' + 2L \rightarrow Ni(NO)XL_2 + L'$ In Equations 3 and 4, L is an electron donor ligand as, for instance, trivalent nitrogen, phosphorus or arsenic or divalent sulfur, X is halogen, and L' is an α,β-unsaturated oxime of the general formula $$R^1R^2C=C(R^3)-C(R^4)=NOH$$

where $R^1$, $R^2$, $R^3$ and $R^4$ are as described for the generic Formula I. Reaction (4) is essentially given by W. Hieber and I. Bauer, Z. anorg. angew. Chem., 321, 107 (1963).

Reaction according to Equation 3 is illustrated as follows:

EXAMPLE A

Triphenylphosphine nickel nitrosyl bromide dimer, $$\{[(C_6H_5)_3P]Ni(NO)Br\}_2$$

To a solution of Ni(NO)Br·$CH_2$=CH—CH=NOH (2.4 g., 10.0 mmoles) in ether (100 ml.) was added triphenylphosphine (2.6 g., 10.0 mmoles). The reaction mixture was stirred at ambient temperature for 1.5 hours and then filtered to provide dimer (3.56 g., 83%).

*Analysis.*—Calcd. for $(C_{18}H_{15}BrNNiOP)_2$ (percent): C, 50.17; H, 3.51; Br, 18.54; N, 3.25; Ni, 13.62; P, 7.19. Found (percent): C, 50.12; H, 3.72; Br, 18.44; N, 3.21; Ni, 13.53; P, 6.90.

The NO stretching frequency occurs at 1745 cm.$^{-1}$ (KBr wafer, Nujol mull).

The triphenylphosphine(nitrosyl)bromonickel formed in this example is shown to dimerize propylene in Examples II and III of U.S. Pat. 3,427,365. The compound can be prepared by replacement from any of the novel complexes of this invention by the reaction of Example A.

EXAMPLE B

Triphenyl phosphite nickel nitrosyl bromide dimer, $$\{[(C_6H_5O)_3P]Ni(NO)Br\}_2$$

A reaction was run as in Example A with 4.80 g. (20 mmoles) of Ni(NO)Br·$CH_2$=CH—CH=NOH and 6.20 g. (20 mmoles) of triphenyl phosphite. The reaction mixture was stirred for 19 hours (probably much longer than necessary) at ambient temperature and then filtered. The precipitate was taken up in dichloromethane and filtered, and the filtrate was concentrated to small volume. Filtration of the concentrated filtrate afforded the analytical sample of dimer (5.28 g., 55%) as very dark purple crystals.

*Analysis.*—Calcd. for $(C_{18}H_{15}BrNNiO_4P)_2$ (percent): C, 45.14; H, 3.16; Br, 16.68; N, 2.92; Ni, 12.26; P, 6.47. Found (percent): C, 44.98, 44.89; H, 3.26, 3.15; Br, 16.74, 16.79; N, 2.92, 3.09; Ni, 12.28; P, 6.61.

The NO stretching frequency occurs at 1820 cm.$^{-1}$ (KBr wafer, Nujol mull).

The dimer formed in Example B is described by W. Hieber and I. Bauer, Z. anorg. angew. Chem. 321, 107 (1963).

Since obvious modifications and equivalents in the invention will be evident to those skilled in the chemical arts, I propose to be bound solely by the appended claims.

The embodiments of the invention in which an exclusive property or privilege is claimed are defined as follows:

1. A complex of an $\alpha,\beta$-unsaturated oxime and a nickel nitrosyl halide, said complex having the formula

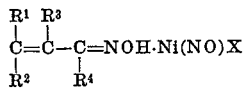

wherein:

$R^1$, $R^2$, $R^3$ and $R^4$, alike or different, are selected from the group consisting of hydrogen or unsubstituted or substituted alkyl, alkoxy, cycloalkyl, aryl, alkenyl, cycloalkenyl, aralkyl or aralkenyl of up to 12 carbon atoms, any substituent being one of the functional groups cyanogen, halogen, alkoxy or —COOR where R is alkyl, aryl, or cycloalkyl of up to 8 carbon atoms; or $R^2$ and $R^4$ may be connected as part of a carbocyclic ring containing up to 16 carbon atoms; and X is fluorine, chlorine, bromine or iodine.

2. The compound of claim 1 wherein the $\alpha,\beta$-unsaturated oxime is that of acrolein.

3. The compound of claim 2 wherein the halogen is bromine.

4. A compound of claim 1 wherein the $\alpha,\beta$-unsaturated oxime is that of methyl vinyl ketone.

5. The method of preparing a compound of claim 1 which comprises reacting nitric oxide with:

(1) a compound of the formula

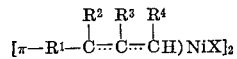

wherein $R^1$, $R^2$, $R^3$ and $R^4$ are as in claim 1; or (2) nickel tetracarbonyl and an allylic halide of the formula

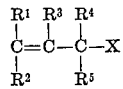

wherein: $R^1$, $R^2$, $R^3$, $R^4$ and X are as in claim 1 and $R^5$ is any of the groups listed for $R^1$, with the provisos that one of $R^1$ and $R^5$ must be hydrogen and X is only Br or I.

6. The process of claim 5 wherein a ($\pi$-allyl)nickel halide is reacted with nitric oxide.

7. The process of claim 6 wherein ($\pi$-allyl)nickel bromide is reacted with nitric oxide.

8. The process of claim 5 wherein nickel tetracarbonyl and allyl bromide are reacted with nitric oxide.

9. The process of claim 5 wherein nickel tetracarbonyl and crotyl bromide are reacted with nitric oxide.

References Cited
UNITED STATES PATENTS

| | | | |
|---|---|---|---|
| 3,013,067 | 12/1961 | Dunn | 260—439 R |
| 3,377,397 | 4/1968 | Maxfield | 260—439 R |
| 3,427,367 | 2/1969 | Maxfield | 260—683.15 D |
| 3,459,703 | 8/1969 | Briggs et al. | 260—439 R |

DELBERT E. GANTZ, Primary Examiner

A. P. DEMERS, Assistant Examiner

U.S. Cl. X.R.

252—429 R, 431 N, 431 P; 260—429 L, 683.15 D